United States Patent [19]

Arragon

[11] Patent Number: 4,761,799
[45] Date of Patent: Aug. 2, 1988

[54] TIME-LOCKING METHOD FOR STATIONS WHICH FORM PART OF A LOCAL STAR NETWORK, AND LOCAL STAR NETWORK FOR PERFORMING THE TIME-LOCKING METHOD

[75] Inventor: Jean-Pierre Arragon, Roissy, France

[73] Assignee: U.S. Philips Corporation, New York, N.Y.

[21] Appl. No.: 35,196

[22] Filed: Apr. 3, 1987

Related U.S. Application Data

[63] Continuation of Ser. No. 490,286, May 2, 1983, abandoned.

[30] Foreign Application Priority Data

Apr. 30, 1982 [FR] France .................. 8207537

[51] Int. Cl.$^4$ ............................. H04L 7/00
[52] U.S. Cl. ......................... 375/107; 370/103
[58] Field of Search ............ 375/106, 107, 109, 113, 375/117; 370/100, 103, 104, 105, 108; 328/62, 72

[56] References Cited

U.S. PATENT DOCUMENTS

| | | | |
|---|---|---|---|
| 3,306,978 | 2/1967 | Simmons et al. | 370/100 |
| 3,418,579 | 12/1968 | Hultberg | 375/107 |
| 3,479,462 | 11/1969 | Yamato et al. | 370/100 |
| 3,504,126 | 3/1970 | Hiroshi Inose et al. | 370/103 |
| 3,808,368 | 4/1974 | Pitroda et al. | 370/108 |
| 3,922,496 | 11/1975 | Gabbard et al. | 370/104 |
| 3,995,111 | 11/1976 | Tsuji et al. | 370/104 |
| 4,320,503 | 3/1982 | Acampora | 370/104 |
| 4,347,604 | 8/1982 | Saito et al. | 370/100 |
| 4,368,987 | 1/1983 | Waters | 375/107 |
| 4,472,802 | 9/1984 | Pin et al. | 370/104 |

Primary Examiner—Robert L. Griffin
Assistant Examiner—Stephen Chin
Attorney, Agent, or Firm—James J. Cannon

[57] ABSTRACT

A time-locking method for stations which form part of a local star network in a multiplex data transmission system in which the exchanges between stations are organized in a single frame permitting the simultaneous writing and reading by way of transmission modules which are connected to the network via a coupler. The method has a first phase during which the forward-/return propagation time is measured between each station and the coupler, a second phase during which the stations are synchronized with the master station, and a third phase duration in which the time position of each station is fixed in a time slot reserved for the locking of this station in the multiplex.

1 Claim, 2 Drawing Sheets

TIME-LOCKING METHOD FOR STATIONS WHICH FORM PART OF A LOCAL STAR NETWORK, AND LOCAL STAR NETWORK FOR PERFORMING THE TIME-LOCKING METHOD

This is a continuation of application Ser. No. 490,286, filed May 2, 1983, now abandoned.

BACKGROUND OF THE INVENTION

1. Field of the Invention

The invention relates to a time-locking method for use in a communication network which has a star structure, said network comprising a plurality of stations, the exchange of information between the stations of the network being organized in a frame which comprises at least as many time slots as there are stations participating in said information exchange, said method comprising inter alia an initialization phase for phase locking the clocks of the stations and a time-locking phase which comprises the transmission of a synchronization word by an arbitrary station forming part of the network and the fixation of the time position of each station in the time slot allocated thereto.

2. Description of the Prior Art

A method of this kind is used in a communication network described in U.S. Pat. No. 3,418,579. This network comprises n stations which can communicate with each other via a satellite which forms the center for the exchange of information between the stations. This exchange of information is organized in a frame which has a duration T and which consists of time slots. Each station has its own time slot. After the initialization phase, a station which is referred to as the master station transmits a synchronization word which is identified by all other stations. Subsequently, each station performs a time-locking operation with respect to this synchronization word in order to fix its time position within the slot allocated thereto. In order to prevent overlapping into the time slot of another station, each time slot comprises an interval which is referred to as the guard interval.

It is a drawback of the method described in said U.S. Patent that this time interval in each time slot each time represents a period of time during which the network is not used, so that the traffic density in the network is reduced.

SUMMARY OF THE INVENTION

It is the object of the invention to provide a time-locking method in which such guard intervals can be dispensed with.

A method in accordance with the invention is characterized in that the method is used in a local network in which each station is connected to the network via a coupler, said method comprising a measuring phase which is individually executed by each station before said time-locking phase and which comprises the measurement of the forward/return propagation time between the relevant station and the coupler. Thanks to the fact that for each station the forward/return propagation time between the station and the coupler is measured, this propagation time can be taken into account in order to advance the transmission of information by the station by this propagation time. Consequently, the transmitted information will arrive at the level of the coupler at the same instant at which the slot allocated to the station appears at the coupler, thus enabling exact fixation of each station in the time slot allocated thereto.

A preferred embodiment of the method in accordance with the invention is characterized in that the measurement of the propagation time comprises several steps:

(a) the transmission of a word by a station to the coupler and at the same time the starting of a time counter;

(b) the reception of said word by the coupler and the retransmission of the word by the coupler to said station;

(c) the reception of said word by said station and at the same time the stopping of said time counter;

(d) the fetching of the value indicated by the time counter and the storage of this value. The measurement of the forward/return propagation time between the station and the coupler is thus comparatively simple.

The invention also relates to a communication network for performing the method in accordance with the invention. Such a communication network is characterized in that each station comprises a counter for measuring the forward/return propagation time between the relevant station and the coupler.

As opposed to large networks of the type Euronet or Transpac, a local network exhibits only a limited geographical spread (no more than a few kilometers), which allows for on the one hand a very high information exchange speed between the stations and on the other hand simple interconnection structures of the bus type, and which also enables optimization of the communications and the distribution of the resources (peripheral apparatus, displays, ...) between various interactive applications within the geography of the organization.

The star structure thus time-locked is attractive for various reasons when the number of stations of the network is comparatively high: (1) the information need not pass through all stations in order to reach the destination station; (2) the losses, being proportional to the number of stations in the case of a looped bus, only amount to a logarithm of this number in the case of a star bus. Finally, in the case of a faulty station in the star structure, another station can replace the faulty station immediately so that the transmission will not be interrupted.

BRIEF DESCRIPTION OF THE DRAWINGS

The various aspects of the invention will now be described in detail hereinafter with reference to the accompanying drawings which show, by way of a non-limitative example, an embodiment of the invention, and in which.

DESCRIPTION OF THE PREFERRED EMBODIMENTS

Figure 1:
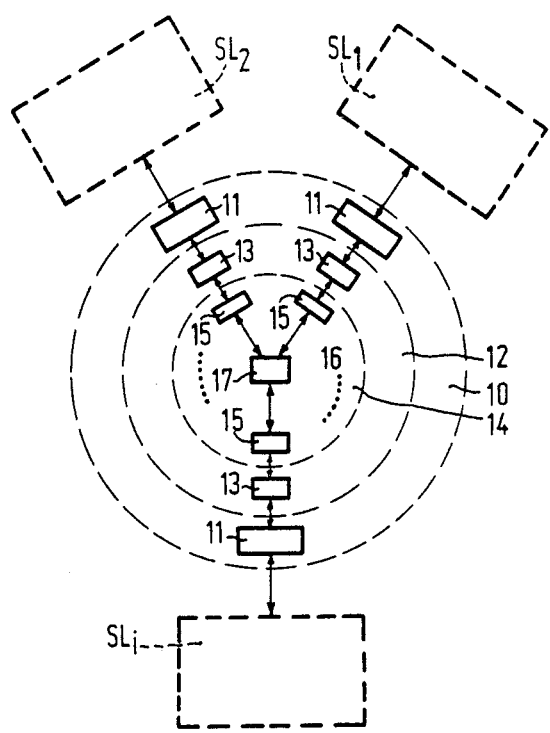
FIG. 1 diagrammatically shows the general organisation in concentric functional layers of a multiplex data transmission and processing system in which the time-locking method for the stations in accordance with the invention is used.

FIG. 1 shows a local communication network having a star structure. This star network comprises several local systems $SL_1, SL_2, \ldots SL_i$, etc. as well as, for the communication between the local systems, an assembly of three functional "layers" which are concentrically situated and which are referred to as the coordination layer 10, the communication layer 12, the transport layer 14 and, in the centre of the three layers, the actual communication network or data circulation bus 16.

The coordination layer 10 is managed by intercommunication processors 11, which comprise special hardware and software which provide for example the different coordination, communication, control, initialization, functions of the various associated local systems $SL_1, SL_2, \ldots SL_i, \ldots$. The communication layer 12 is managed by communication modules 13 which are associated with the various local systems and which also comprise special hardware and software which provide the management of the communication protocols between these local systems, that is to say for example the management of the means for establishing logic connections, for controlling the data output, for presenting synchronisation data at the level of each local system $SL_i$, or for the detection of errors. The transport layer 14, which forms the central node of the network comprises transmission modules 15, a star bus 16 and a coupler 17, said modules 15 themselves comprising special hardware and software for maintaining the synchronization between the communication modules 13 and the bus 16, for performing the electro-optical and opto-electronic conversions when the bus 16 is an optical bus, for checking for any parity errors, for the encoding and decoding of each transmission frame on the bus 16, for ensuring correct transmission and reception of the data in the time slots allocated to each local system $SL_i$, and for managing the initialization procedure enabling the synchronization of the transmission on the bus. The various modules of this network are described in more detail in U.S. Pat. No. 4,439,699.

The invention is carried out in the transport layer 14 and concerns a time-locking method for the stations. In the described embodiment, the bus 16 is an optical bus, but this is by no means a restriction; the invention is applicable equally well to coaxial cable buses or other buses. The transport layer 14 of the system is formed on the one hand by a coupler 17 (which may operate by transmission as in the described embodiment or by reflection) and on the other hand by transmission modules 15 which form the interface between the optical star bus 16 and the communication modules 13 of the communication layer 12, said transmission modules being connected to the bus.

A word transmitted by a transmission module is inserted into the bus by passive coupling; this means that the words forming the transmission frame are inserted one after the other in time slots. Each module 15$i$ has a time slot available for the transmission of data.

Contrary to a looped configuration, the stations in the described star configuration do not have a particular rank. All stations are equivalent and only the exchange protocol used for the transmission of information imposes such a rank afterwards. Any station is thus capable of acting as the master station with respect to the other stations; this means that notably when the master station is defective, the defective station can be replaced by another station so that a high system reliability is achieved. The absence of rank results into a simultaneous organization of the exchanges, that is to say in a single frame during which the stations can write and read simultaneously with a station time-locking mode which is achieved as described hereinafter.

Figure 2:
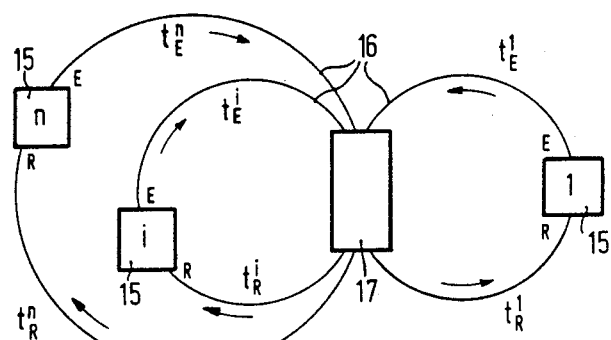
FIG. 2 shows the star bus configuration.

First the following elements will be defined:
T = duration of the frame (comprising, for example as many slots as there are stations).
n = number of stations
$t_E$ = propagation time between a transmission module 15 and the coupler (this time corresponds to one write or transmission phase).
$t_R$ = propagation time between the coupler and a transmission module (this time corresponds to one read or receiving phase). FIG. 2, illustrating the configuration of the star bus 16, shows these propagation times $t_E^1, t_R^1, \ldots, t_E^i, t_R^i, \ldots t_E^n, t_R^n$, of the stations $SL_1, \ldots, Sl_i, \ldots SL_n$.

T being the duration of the frame and i being the rank number of the n stations, the beginning of the slot of the station i is thus "separated" from the coupler 17 by a period which is, of course, equal to $(T/n) \times i$ (the time slots need not be superposed) and, taking into account the propagation time between a station and a coupler which equals $t_E^i$ for the station i, the transmission by the station I must be advanced by a period $t_E^i$. Taking into account these definitions, in order to ensure that the insertion of the data transmitted by the station i is correct at the level of the coupler 17, it is sufficient for the $i^{th}$ station to transmit with a time advance equal to: $(iT/n) - t_E^i$ (the minus sign has for consequence a delay of at least one frame for the insertion). Consequently, the $i^{th}$ station should transmit $|T + (iT/n) - t_E^i - t_R^i|$ seconds after a synchronization word which initializes a frame K in order to ensure that the insertion is correctly performed in the next frame K + 1 (it is assumed that the times $t_E$, $t_R$ and $t = t_E + t_R$ are shorter than the duration of a frame; if they are not, the calculation remains similar, but the insertion will take place simply with a delay of several frames).

The locking of the stations can be performed in the following phases:

(a) A first, very accurate measuring phase by each station $1, 2, \ldots i \ldots n$, of the time $t^i = t_E^i + t_R^i$ which is equal to forward/return propagation time between the station concerned and the coupler, because the duration of the frame corresponds exactly to the number of stations (the desired accuracy amounts to some tenths of a bit in this case). The measurement results are subsequently stored in a memory of the station, each station storing only its relevant value.

Figure 4:
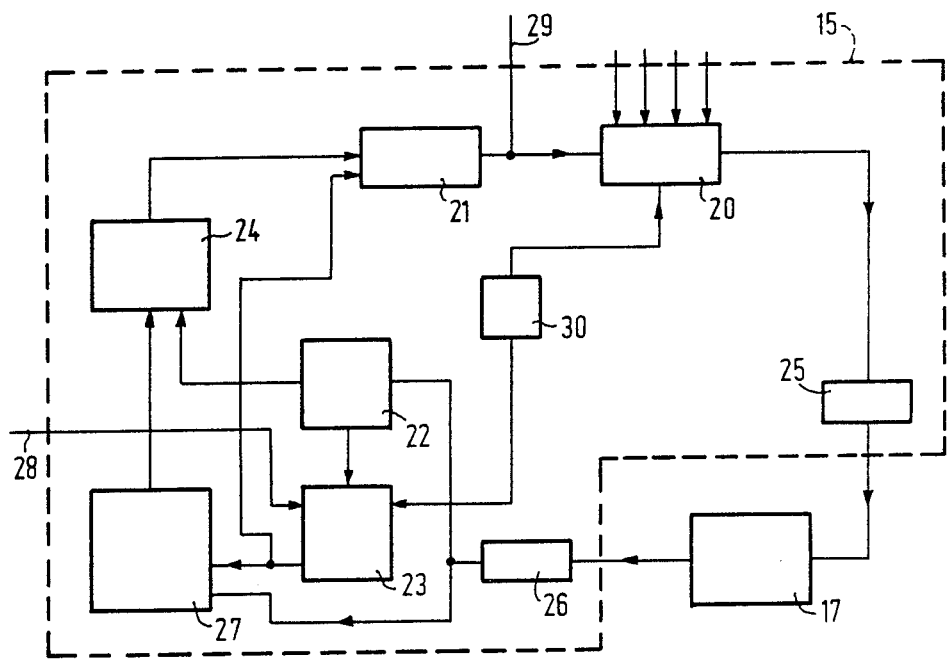
FIG. 4 shows a time-locking circuit of a station.

The execution of this first phase by a station i will now be described with reference to FIG. 4 which shows an automatic time-locking circuit of a transmission module 15. This circuit comp-rises an opto-electronic conversion module 25 for the transmission and an opto-electronic conversion module 26 for the reception of a word to be transmitted to the coupler 17. The word to be transmitted is loaded into a register 20 which is controlled by means of control circuit 21.

For the measurement of $t^i = t_E^i + t_R^i$, a word is transmitted under the control of a signal which is generated by the station and which is presented, via the line 29, to a control input of the register 20. At the instant of transmission of this word, the station starts the counter 23 by way of a command which is applied to the counter via the line 28. This counter 23 counts the clock pulses of the pulse generator 30 which generates pulses at the signalization frequency. The signalization frequency $f_s$ equals the number of bits in a frame multiplied by the word frequency. Upon arrival of the word at the coupler 17 (i.e. after a period $t_E^i$), the coupler retransmits the same word which will subsequently be received by the station (after a period $t_R^i$). The detector 22, one input of which is connected to the opto-electronic conversion module 26, detects the reception of this wird and stops the counter 23. The counter 23 then indicates the value $t^i = t_E^i + t_R^i$ which will be stored in the memory 27, an input of which is connected to an output of the counter 23.

(b) During the second, initialization phase, a first station which is considered to be the "master" station (this provisional rank is created afterwards and, as has already been stated, any station may act as the master station, depending on he circumstances) permanently transmits a signal having a frequency which is referred to as the signalization frequency $f_s$ and which represents a particular pattern which enables the synchronization of all stations (that is to say, synchronization of the clocks of the stations for synchronous operation). This initialization phase is described in more detail in the article "Système informatique réparti autour d'un bus optique", by G. Auron, J. P. Arragon and G. Segarra, published in Acta Electronica 24, No. 1, 1981/1982, pages 53-65.

(c) During a third, time-locking phase for the stations in multiplex, the master station transmits a synchronization word $SW_1$ which permits fixation of the time position of each station in the slot reversed for this station during the locking in the multiplex. This third phase will be described in greater detail with reference to FIG. 4. Upon arrival of the synchronization word $SW_1$ at the level of the coupler 17, the coupler transmits this word to the stations. The detector 22 of the station i detects the reception of the synchronization word $SW_1$ and transmits this information to the control circuit 24. In the memory 27 there are stored the values T (duration of the frame), n (number of stations), i (number of the station) and $t^i = t_E^i + t_R^i$. These different values are either stored once in the memory 27 and are then available on request, or are loaded into the memory 27 by the master station during this third phase.

The reception of the synchronization word $SW_1$ initializes the control circuit 24 which then fetches the values T, i and n from the memory 27 in order to determine the value iT/n. Subsequently, the control circuit fetches the value $t^i = t_E^i + t_R^i$ from the memory 27 and determines the value $[i(T/n) - t_E^i - t_R^i]$. This value $[i(T/n) - t_E^i - t_R^i]$ is stored either in the memory 27 or in the control circuit itself.

After the execution of these three phases, the locking of the stations is terminated. The transmission of a data word by the station i is then performed as described hereinafter. The master station transmits another synchronization word SW to the coupler 17, thus initializing a new frame. After a time $t_R^i$, the detector 22 detects that the synchronization word SW has passed the level of the coupler 17. In reaction to the reception of the synchronization word SW, the counter 23 is reset to zero and is started. The control circuit 24 determines the value $jT + [i(T/n) - t_E^i - t_R^i]$ (where $1 \leq j \leq m$, MEn as a function of the number of delay frames to be transmitted by the station) and presents this value to a first input of the control circuit 21. A second input of this control circuit is connected to an output of the counter 23. When the counter 23 reaches the value $jT + [i(T/n) - t_E^i - t_R^i]$, the control circuit 21 transmits a control signal to the register 20, thus causing the transmission of the data word to be transmitted.

Figure 3:
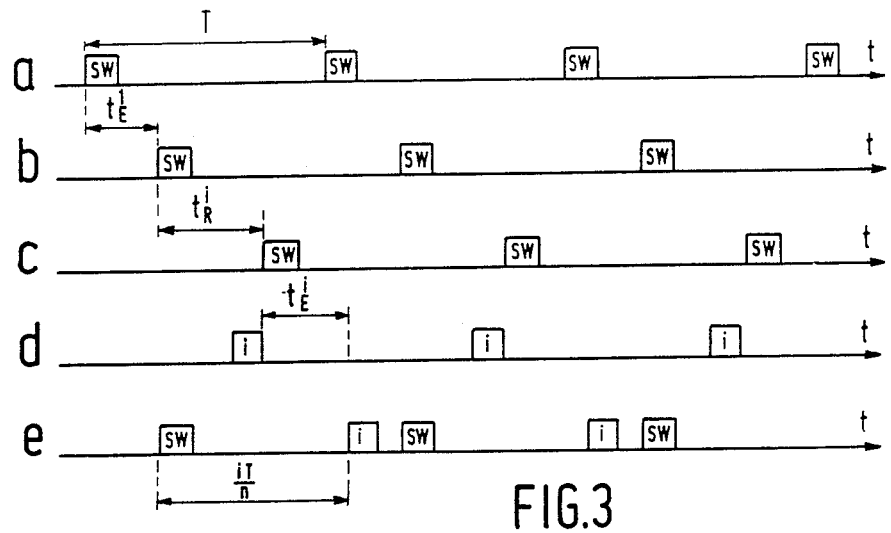
FIG. 3 shows a set of diagrams illustrating the time relations between the stations and the coupler via the bus.

Using time diagrams, the FIGS. 3a through 3e illustrate the time relations established during the transmission operation E or the reception operation R between the station which has become the master station, the other stations and the coupler. FIG. 3a shows the transmission of the synchronization word SW at the level of the station 1 (master station); FIG. 3b shows the reception of this synchronization word at the level of the coupler 17; FIG. 3c shows the reception of this synchronization word by the station i; FIG. 3d shows the transmission of information at the level of this station i; FIG. 3e shows the reception at the level of the coupler 17 of the information transmitted by the station i.

It appears that the word is transmitted with an advance of $t_E^i + t_R^i$, in order to compensate for the distance between the coupler and the station, and at the instant $jT + iT/n$, that is to say in the time slot allocated thereto. A word is thus correctly inserted after a synchronization word and no earlier than the next frame without time between the other slots being lost.

What is claimed is:

1. In a local communication network which has a star structure and which comprises a plurality of stations, each station having a clock and being connected to a central node which comprises a coupler, the exchange of messages between said stations of said network being organized at the level of said coupler in successive frames of time division time slots, each station being allocated to at least one time slot in each frame; a time-locking method for enabling each station to transmit its message in its allocated time slot, such method comprising:

an initialization phase in which an arbitrary one of said stations serves as a master station which transmits a synchronizing signal for phase locking said clocks of all of said stations;

a measuring phase in which each station individually determines its own forward and return propagation time for a message from said station to said coupler and back from said coupler to said station, such measuring phase comprising, for each individual station, the steps of:

(a) transmission of a word by such station to said coupler and simultaneously starting a time counter;

(b) reception and retransmission of such word by said coupler back to such station;

(c) reception of said retransmitted word by such station and simultaneously stopping said time counter; and (d) storing in such station the measured forward and return word propagation time as indicated by said time counter; and a time-locking phase which comprises:

(e) transmission by said arbitrary one station of a synchronization word to said coupler;

(f) reception and retransmission of said synchronization word by said coupler to each of said stations;

(g) reception of said retransmitted synchronization word by each of said stations; and (h) transmission by each station of its message after a time delay following the synchronization word received thereby which is advanced in accordance with the measured forward and return word propagation time between said station and said coupler, whereby the message transmitted by each station is inserted in the time slot allocated to such station.

* * * * *